United States Patent Office 3,817,911
Patented June 18, 1974

3,817,911
DIRECT SYNTHESIS OF COMPOSITE MATERIALS
Lynn J. Taylor, 1307 Buckingham Road,
Haslett, Mich. 48840
No Drawing. Filed Apr. 7, 1972, Ser. No. 242,132
Int. Cl. C08g 51/04
U.S. Cl. 260—38
5 Claims

ABSTRACT OF THE DISCLOSURE

There is disclosed an *in situ* process for the preparation of a composite material consisting essentially of an organic polymer or copolymer having dispersed therein an inorganic oxide or mixture of oxides, said process comprising the simultaneous or sequential synthesis of the organic polymer from at least one non-polymeric organic precursor and of the inorganic oxide or oxide mixture derived from at least one inorganic-oxide precursor.

BACKGROUND OF THE INVENTION

Composite materials have been shown to have a variety of practical uses. The reinforced or "filled" plastics constitute an important and useful class of composite materials; such materials consist of an organic polymer matrix, within which there is dispersed an inorganic solid, typically in the form of fibers, flakes, spheres, or fine particles. A variety of materials, including paint films, adhesives, colored plastics, and compounded rubbers, are, in fact, composite materials in this sense.

Each of the components contributes characteristic properties to the resulting composite material. The polymer contributes ease of shaping, cohesiveness, impact resistance, flexibility, etc. The inorganic solid contributes rigidity and dimensional stability, and possibly certain more specialized properties such as opacity, color, electrical conductivity, chemical and thermal stability, etc.

In many cases of practical importance, the inorganic component is an oxide or mixture of oxides. Typical examples include silica, alumina, glass, talc, and pigments such as zinc oxide and titanium dioxide.

In preparing and fabricating composite materials, it is customary to disperse the inorganic solid in a molten polymer or polymer solution, to shape the resulting mixture and/or apply it to a supporting surface, and to allow the mixture to solidify by cooling or by solvent evaporation. Alternatively, the inorganic solid may be dispersed in an organic monomer, prepolymer, or mixture or solution thereof; the resulting dispersion is shaped or applied to a supporting surface, and the preparation of the composite material is then completed by polymerization *in situ*.

DESCRIPTION OF THE INVENTION

In accordance with this invention, an organic polymer-inorganic solid composite material is prepared by the simultaneous or sequential *in situ* synthesis of both ingredients.

More particularly, a composite material, typically a physical mixture of an organic polymer and an inorganic oxide or oxide mixture, is prepared by the chemical conversion of a non-polymeric organic precursor to the organic polymer, with simultaneous or subsequent conversion of an inorganic-oxide precursor to the inorganic oxide or oxide mixture.

The term "non-polymeric organic precursor," as used herein, may be defined as any non-polymeric organic compound, or mixture of such compounds, which may be converted to an organic polymer under the influence of heat, light, or catalyzing reagents. Typical examples of such non-polymeric organic precursors include ethylenically unsaturated monomers such as acrylic acid and salts thereof, acrylamide, acrylonitrile, n-butyl methacrylate, 1,3-butadiene, diallyl phthalate, diacetone acrylamide, dibutyl itaconate, ethyl acrylate, ethyl methacrylate, ethyl vinyl ether, hydroxyethyl methacrylate, isoprene, methacrylic acid and salts thereof, methacrylonitrile, methacrylamide, methyl acrylate, methyl methacrylate, alpha-methyl styrene, styrene, vinyl acetate, vinyl chloride, and vinylidene chloride; difunctional and polyfunctional amines, such as ethylenediamine, 1,3-propanediamine, 1,6-hexanediamine, diethylenetriamine, triethylenetetramine, benzidine, p-phenylenediamine, 4,4'-methylenedianiline, 4,4'-oxydianiline, and p,p'-diaminodiphenylsulfone; anhydrides such as maleic anhydride, phthalic anhydride, trimellitic anhydride, pyromellitic dianhydride, and benzophenone tetracarboxylic acid dianhydride; difunctional acyl halides such as adipyl chloride, sebacyl chloride, phthaloyl chloride, and terephthaloyl chloride; difunctional and polyfunctional alcohols such as ethylene glycol, diethylene glycol, propylene glycol, dipropylene glycol, 1,3-butanediol, 1,4-butanediol, 1,6-hexanediol, glycerol, 1,1,1-trimethylolethane, and pentaerythritol; difunctional and polyfunctional carboxylic acids such as adipic acid, azelaic acid, fumaric acid, maleic acid, phthalic acid, isophthalic acid, terephthalic acid, sebacic acid, and trimellitic acid; diesters such as diethyl adipate, diethyl isophthalate, diethyl terephthalate, dimethyl terephthalate, diphenyl terephthalate, and bis-(hydroxyethyl)terephthalate; and miscellaneous organic compounds such as aniline and substituted anilines, 2,2-bis-(p-hydroxyphenyl)-propane, diethyl carbonate, diphenyl carbonate, diethylene glycol bis(chloroformate), ethylene glycol bis(chloroformate), ethanolamine, formaldehyde, glycolic acid, p-hydroxybenzoic acid, melamine, alpha-naphthol, beta-naphthol, phenol and substituted phenols, and urea.

The term "inorganic-oxide precursor," as used herein, may be defined as an inorganic or metallo-organic compound, or mixture of such compounds, which may be converted to an inorganic oxide in the presence of water, heat, oxygen, and/or catalyzing reagents. Typical examples of inorganic-oxide precursors include acetate, acetylacetonates, alkoxides, carbonates, chelates, 2-ethylhexanoates, formates, halides, naphthenates, phenoxides, and stearates of the metals and metalloids.

The term "metal," as used herein, may be defined as a chemical element which, when present in the chemically uncombined state, is characterized by luster and by high electrical and thermal conductivity. Preferred metals include aluminum, lead, titanium, and zinc.

The term "metalloid," as used herein, may be defined as a chemical element which, when present in the chemically uncombined state, is characterized by luster and conductivity properties intermediate between those of the true metals and those of the non-metals. The metalloids include boron, silicon, and arsenic.

Preferred inorganic-oxide precursors are those which can be hydrolyzed to the corresponding oxides. Specific examples include aluminum chloride, aluminum ethoxide, aluminum isopropoxide, aluminum phenoxide, triethyl borate, silicon tetrachloride, tetraethyl orthosilicate, tetramethyl orthosilicate, titanium tetrachloride, tetraethyl orthotitanate, and tetraisopropyl orthotitanate.

Thee term "oxide mixture," as used herein, should be understood to include multiple oxides, inorganic glasses, and ceramic materials as well as simple physical mixtures of two or more inorganic oxides. Such materials may be crystalline, amorphous, or partially crystalline and partially amorphous.

As used herein, the term "composite material" is intended to include reaction products in which the organic and inorganic constituents are chemically bonded together, as well a simple physical mixtures of the organic and inorganic constituents. Thus reaction products in which the polymer and the inorganic oxide are linked by covalent chemical bonds would be considered composite materials, as would reaction products in which metallo-organic polymer molecules are present.

In one specific embodiment of the present invention, a polyester/silica composite material is prepared by the reaction of a dicarboxylic acid, a diol, and tetraethyl orthosilicate. In effect, the water formed as a byproduct of the condensation polymerization serves as a reagent for conversion of the tetraethyl orthosilicate to silica.

In a second specific embodiment, a poly(esteramide)/silica composite material is similarly prepared by the reaction of a dicarboxylic acid, ethanolamine, and tetraethyl orthosilicate.

In a manner analogous to the first two specific embodiments, a "filled" polyamide may be prepared by the reaction of a dicarboxylic acid, a diamine, and a suitable inorganic-oxide precursor. Likewise, a "filled" polyester may be prepared by the reaction of an organic anhydride, a diol, and a suitable inorganic-oxide precursor.

In a third specific embodiment of the present invention, a polyurethane/silica composite material is prepared by the "interfacial polycondensation" of a diamine and a bischloroformate, followed by hydrolysis of silicon tetrachloride in the resulting (aqueous) reaction medium. In an analogous manner, suitably "filled" polycarbonates, polyesters, and polyamides may be prepared.

In a fourth specific embodiment of the present invention, an acrylic polymer/alumina composite material is prepared by the suspension polymerization of an acrylic monomer followed by hydrolysis of aluminum isopropoxide in the resulting aqueous reaction medium.

In a fifth specific embodiment, an acrylic polymer/alumina composite material is prepared by the emulsion polymerization of an acrylic monomer, followed by hydrolysis of aluminum isopropoxide in the resulting emulsion.

In a manner analogous to the fourth and fifth specific embodiments, suitably "filled" acrylic polymers and copolymers, styrene polymers and copolymers, vinyl acetate polymers and copolymers, or vinyl halide polymers and copolymers may be prepared by polymerization of the corresponding monomers in an aqueous suspension or emulsion, with simultaneous or subsequent hydrolysis of a suitable inorganic-oxide precursor in the same aqueous medium.

In a sixth specific embodiment, a phenolic resin/silica composite material is prepared by the reaction of phenol, formaldehyde, and tetraethyl orthosilicate in a basic or acidic aqueous medium. Likewise, other "filled" phenol-formaldehyde, aniline-formaldehyde, melamine-formaldehyde, or urea-formaldehyde resins may be prepared by reaction of phenol, aniline, melamine, or urea with formaldehyde, with simultaneous or subsequent hydrolysis of a suitable inorganic-oxide precursor, in an acidic or basic aqueous medium.

From the foregoing description it will be apparent that the composite materials prepared in accordance with this invention are frequently obtained as components of a fluid reaction mixture. Isolation of the composite materials as solids may be accomplished by any of a variety of methods known in the prior art, such as filtration, precipitation, evaporation, extraction, sedimentation, etc. In some instance, the fluid reaction mixture may be used directly, e.g. as an ingredient in the formulation of adhesives, paints, printing inks, etc.

As a further possibility, a suitable composition may be fabricated into a desired shape, or applied as a coating to a substrate, following the polymerization process but prior to the conversion of the inorganic-oxide precursor to the oxide; said conversion is thereby accomplished *in situ*.

In comparison to prior-art methods for the preparation of similar composite materials, the practice of the present invention offers several advantages. In particular, the need for a separate step, in which a previously obtained "filter" is dispersed in a previously synthesized polymer, is avoided. In the case of the present invention, the "filler" is ordinarily produced in a finely divided state, intimately mixed with the polymer.

The composite materials prepared in accordance with this invention may be used directly, or may be used as starting materials for further chemical conversions. For example, a "filler" polyester of relatively low molecular weight may subsequently be treated with an aliphatic or aromatic diisocyanate, so as to form a "filled" polyurethane. A "filled" unsaturated polyester may subsequently be treated with a vinyl monomer such as styrene, and the resulting composition may be heated in the presence of a free-radical initiating reagent to form a "filled" thermoset composition. A "filled" polyamide or poly(esteramide) may subsequently be treated with an epoxy resin and the resulting composition heated to form a filled thermoset composition. A "filled," partially converted phenol-formaldehyde, melamine-formaldehyde, or urea-formaldehyde resin may subsequently be treated with a crosslinking catalyst or reagent and the resulting composition heated to produce a filled thermoset composition.

The composite materials prepared in accordance with this invention have value as molding compositions, adhesive and coating compositions, ablative materials, and as additives for plastics, paints, adhesives and printing inks.

The following examples represent some of the best embodiments contemplated by the inventor in the practice of this invention.

EXAMPLE 1

A three-necked flask, fitted with a mechanical stirrer, heating mantle, gas inlet, and a 2-inch distilling column packed with stainless steel sponge, was charged with 59.04 grams (g.) (0.50 mole) succinic acid, 31.03 g. (0.50 mole) ethylene glycol, and 26.04 g. (0.125 mole) distilled tetraethyl orthosilicate. A nitrogen atmosphere was maintained while the reaction mixture was heated a total of 14½ hours; during this period the temperature of the reaction mixture gradually rose from 90° C. to 180° C., and 29 milliliters (ml.) of ethanol was obtained as a distillate, having a boiling temperature of 77–78° C.

After cooling to room temperature, the product was removed from the reaction flask as a hard, waxy solid. It was found that the product could be separated into soluble and insoluble fractions by extraction with chloroform or with hot benzene. The soluble fraction was identified as poly(ethylene succinate) by comparison of its infrared spectrum with that of an authentic sample of the polymer; vapor-pressure osmometry indicated that the polymer had a number-average molecular weight of 745. Infrared examination of the insoluble fraction indicated that it was hydrated silica; further examination by microscopy, X-ray, and surface-area techniques indicated that the insoluble fraction was amorphous silica, having a surface area of ca. 260 square meters per gram.

EXAMPLE 2

A three-necked flask, fitted with a magnetic stirrer, heating mantle, gas inlet, and a 3-inch distilling column packed with stainless steel sponge, was charged with 31.04 g. (0.50 mole) distilled ethylene glycol and 104.17 g. (0.50 mole) distilled tetraethyl orthosilicate. A nitrogen atmosphere was maintained while the mixture was stirred and heated 5 hours at 115–130° C.; during this period, 43 ml. of ethanol was removed as a clear distillate, boiling at 79–79.5° C. The reaction mixture was allowed to cool to room temperature, and 73.08 g. (0.50 mole) adipic acid and 200 ml. distilled tetrahydronaphthalene were added. The resulting mixture was heated an additional 21 hours at 145–210° C.; this caused an additional 50 ml. of distillate, boiling at 76–79° C., to be collected. Then p-toluenesulfonic acid (0.20 g.) was added and the mixture heated another 6½ hours at 208–210° C.

The distilling column was replaced by a short distillation adapter containing a small plug of stainless steel sponge, and the gas inlet was repositioned so that slow flow of nitrogen would tend to sweep distillate through the adapter and into a graduated receiver. The reaction mixture was then heated 6 hours at 200–210° C.; this served to remove a trace of ethanol, followed by ca. 100 ml. of tetrahydronaphthalene.

The crude solid reaction product was separated from a small liquid layer, transferred to a Waring Blendor container, and agitated vigorously with 100 ml. of benzene. Then 400 ml. of hexane was added to re-precipitate the polymer; the resulting mixture was filtered and the precipitate dried in vacuo. A portion of the dried product was separated into soluble and insoluble fractions by extraction with hot benzene. Vapor-pressure osmometry indicated that the soluble fraction was a polymer having a number-average molecular weight of 726.

EXAMPLE 3

A three-necked flask fitted with magnetic stirrer, heating mantle, gas inlet, and a 3-inch distilling column packed with stainless steel sponge was charged with 36.53 g. (0.25 mole) adipic acid, 15.27 g. (0.25 mole) monoethanolamine, 52.08 g. (0.25 mole) tetraethyl orthosilicate, and 50 ml. tetrahydronaphthalene. The reaction mixture was heated under nitrogen for a total of 15 hrs. at 100–205° C.; this caused 54 ml. of ethanol to be collected as a distillate boiling at 78–79° C.

After cooling to room temperature, the reaction mixture consisted of a yellow liquid and a hard yellow solid. The liquid was removed by decantation and the solid was crushed, pressed on a porous plate, and subsequently dried in vacuo. The dried solid was separated into soluble and insoluble fractions by extraction with chloroform. Infrared examination indicated the soluble fraction to be a poly(esteramide); it was shown to have a number-average molecular weight of 825 by vapor-pressure osmometry.

EXAMPLE 4

A three-necked flask fitted with mechanical stirrer, heating mantle, gas inlet, and reflux condenser was charged with 35.5 g. (0.25 mole) distilled n-butyl methacrylate, 61.3 g. (0.30 mole) aluminum isopropoxide, 1.0 g. tert-butyl peroctoate, 10 ml. of 5% aqueous poly(methacrylic acid), 5 g. disodium hydrogen phosphate heptahydrate, and 200 ml. distilled water. The mixture was refluxed 10 hours in a nitrogen atmosphere, then allowed to cool and filtered. The solid reaction product was washed thoroughly with distilled water, filtered again, crushed on a porous plate, and dried in vacuo. The resulting white solid was separated into soluble and insoluble fractions by extraction with benzene. The benzene-soluble fraction was identified as poly(n-butyl methacrylate) by infrared spectrophotometry; its number-average molecular weight, as determined by vapor-pressure osmometry, was 11,500.

The benzene-insoluble fraction was shown to inorganic by its failure to ignite in the flame of a Bunsen burner.

EXAMPLE 5

An ice-cold solution of 11.62 g. (0.10 mole) 1,6-hexanediamine and 49.6 g. (0.40 mole) sodium carbonate monohydrate in 400 ml. distilled water was placed in a Waring Blendor container and agitated vigorously while a solution of 23.10 ,0.10 mole) distilled diethylene glycol bis(chloroformate) in 100 ml. dry methylene chloride was added all at once. The resulting mixture was agitated vigorously for 40 minutes. Then a solution of 16.99 g. (0.10 mole) silicon tetrachloride in 100 ml. dry methylene chloride was added, in small portions, over a 20-minute period. The reaction mixture was stirred one hour at room temperature, then filtered by suction. The product, a white solid, was washed thoroughly with cold distilled water, then dried in vacuo. The dried product was separated into soluble and insoluble fractions by extraction with hot chloroform. The soluble fraction was a colorless, film-forming polymer which had a number-average molecular weight of 2,879, as measured by vapor-pressure osmometry.

I claim:

1. A process for preparation of a composite material of at least one organic polymer having at least one inorganic oxide dispersed therein, which process comprises:
   mixing together a non-polymeric organic precursor and an inorganic-oxide hydrolyzable precursor;
   polymerizing the non-polymeric organic precursor while simultaneously synthesizing the inorganic-oxide from the hydrolyzable precursor so as to prepare the inorganic-oxide in situ of the organic polymer;
   and recovering the resulting composite material.

2. The process of claim 1 wherein the non-polymeric organic precursor is at least one ethylenically unsaturated monomer.

3. The process of claim 1 wherein a suspension polymerization process is utilized.

4. The process of claim 1 wherein an emulsion polymerization process is utilized.

5. The process of claim 1 wherein the inorganic-oxide component contains at least one material selected from silicon dioxide, boron oxide, aluminum oxide, titanium oxide, lead oxide, and zinc oxide.

References Cited
UNITED STATES PATENTS

| | | | |
|---|---|---|---|
| 3,102,822 | 9/1963 | Te Grotenhuis | 260—40 R X |
| 3,607,823 | 9/1971 | Crovatt | 260—37 N |
| 3,533,984 | 10/1970 | Yamamoto et al. | 260—37 N |
| 3,441,523 | 4/1969 | Dwyer et al. | 260—37 N X |
| 3,607,794 | 9/1971 | Abbotson et al. | 260—37 N X |

LEWIS T. JACOBS, Primary Examiner

U.S. Cl. X.R.

260—37 N, 37 PC, 39 R, 40 R, 41 R